United States Patent
Diemer et al.

(10) Patent No.: US 8,985,542 B2
(45) Date of Patent: Mar. 24, 2015

(54) SENSOR ASSEMBLY FOR A MOVABLE SEAT

(75) Inventors: Rolf Diemer, Alsheim (DE); Günther Grübler, Rüsselsheim (DE); Gottfried Nienhaus, Altrip (DE); Roland Grieser, Heppenheim (DE); Daniel Coles, Mainz (DE)

(73) Assignee: Lear Corporation, Southfield, MI (US)

( * ) Notice: Subject to any disclaimer, the term of this patent is extended or adjusted under 35 U.S.C. 154(b) by 493 days.

(21) Appl. No.: 12/859,242

(22) Filed: Aug. 18, 2010

(65) Prior Publication Data

US 2011/0043010 A1 Feb. 24, 2011

(30) Foreign Application Priority Data

Aug. 19, 2009 (DE) .......................... 10 2009 038 072

(51) Int. Cl.
*B60N 2/07* (2006.01)
*B60N 2/02* (2006.01)

(52) U.S. Cl.
CPC ........... *B60N 2/07* (2013.01); *B60N 2002/0268* (2013.01); *B60N 2002/0272* (2013.01)
USPC ....................... 248/429; 297/217.3

(58) Field of Classification Search
USPC ................. 248/420, 423, 424, 550, 429, 430; 297/344.1, 344.11, 341, 468, 217.3, 297/217.2; 324/207.2, 207.22, 207.24, 324/207.13; 280/735; 340/500, 667; 180/271
See application file for complete search history.

(56) References Cited

U.S. PATENT DOCUMENTS

| | | | |
|---|---|---|---|
| 6,053,529 A | 4/2000 | Frusti et al. | |
| 6,488,250 B1 * | 12/2002 | Munch | 248/430 |
| 6,593,735 B2 | 7/2003 | Becker | |
| 6,774,625 B2 | 8/2004 | Suzuki et al. | |
| 6,851,655 B2 | 2/2005 | Kume et al. | |
| 6,854,782 B2 | 2/2005 | Reichert et al. | |
| 6,921,107 B2 | 7/2005 | Mills et al. | |
| 6,935,692 B2 | 8/2005 | Nishide et al. | |
| 7,164,117 B2 * | 1/2007 | Breed et al. | 250/221 |
| 7,322,605 B2 | 1/2008 | Ventura et al. | |
| 7,400,947 B2 | 7/2008 | Endo et al. | |
| 7,511,479 B2 * | 3/2009 | Schuler et al. | 324/207.2 |

(Continued)

FOREIGN PATENT DOCUMENTS

EP 090235 B1 10/1983
EP 0191272 A1 8/1986

OTHER PUBLICATIONS

Translation of Official Communication in Lear Corporation Application No. 10 2009 038 072.8 dated Mar. 24, 2010.

*Primary Examiner* — Tan Le
(74) *Attorney, Agent, or Firm* — MacMillan, Sobanski & Todd, LLC

(57) ABSTRACT

A slide assembly includes a first member and a second member support for movement relative to the first member. The slide assembly also includes a sensor supported on one of the first member and the second member and a target supported on the other of the first member and the second member. The sensor generates a signal when the target is within a detection bounds. The slide assembly is characterized in that cooperating guides are supported relative to the sensor and the target and are engageable with one another to maintain a predetermined alignment between the sensor and the target.

18 Claims, 4 Drawing Sheets

(56) References Cited

U.S. PATENT DOCUMENTS

| | | |
|---|---|---|
| 7,564,234 B2 * | 7/2009 | Endoh et al. .............. 324/207.24 |
| 8,054,203 B2 * | 11/2011 | Breed et al. ................... 340/931 |
| 2006/0167595 A1 * | 7/2006 | Breed et al. ....................... 701/1 |
| 2011/0043010 A1 * | 2/2011 | Diemer et al. ............. 297/217.3 |
| 2011/0280700 A1 * | 11/2011 | Uttech et al. .................. 414/540 |
| 2012/0226283 A1 * | 9/2012 | Meridew et al. ................ 606/81 |

* cited by examiner

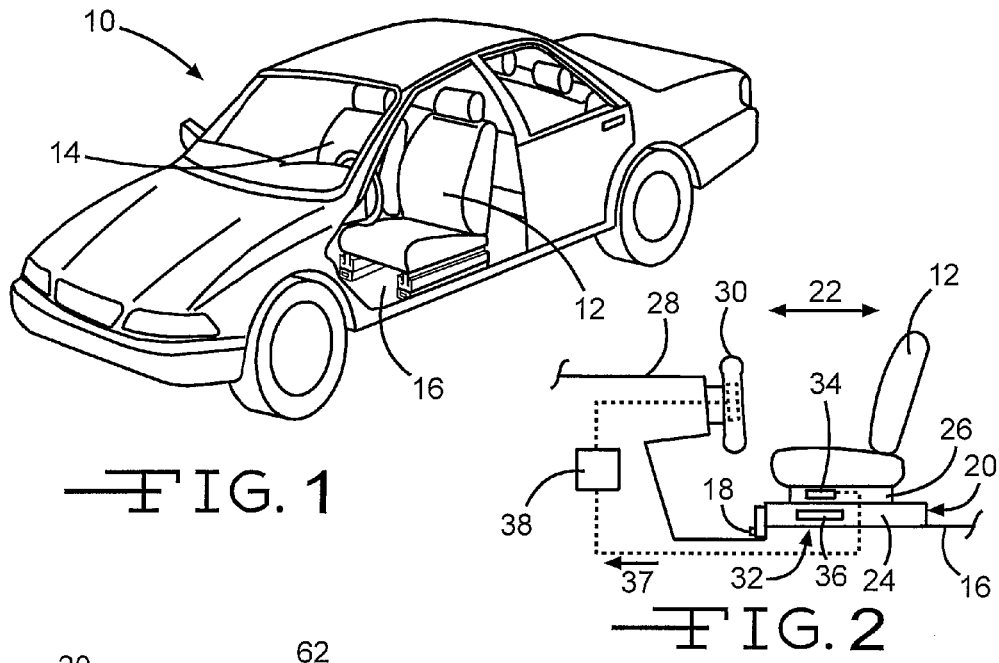
FIG. 1
FIG. 2
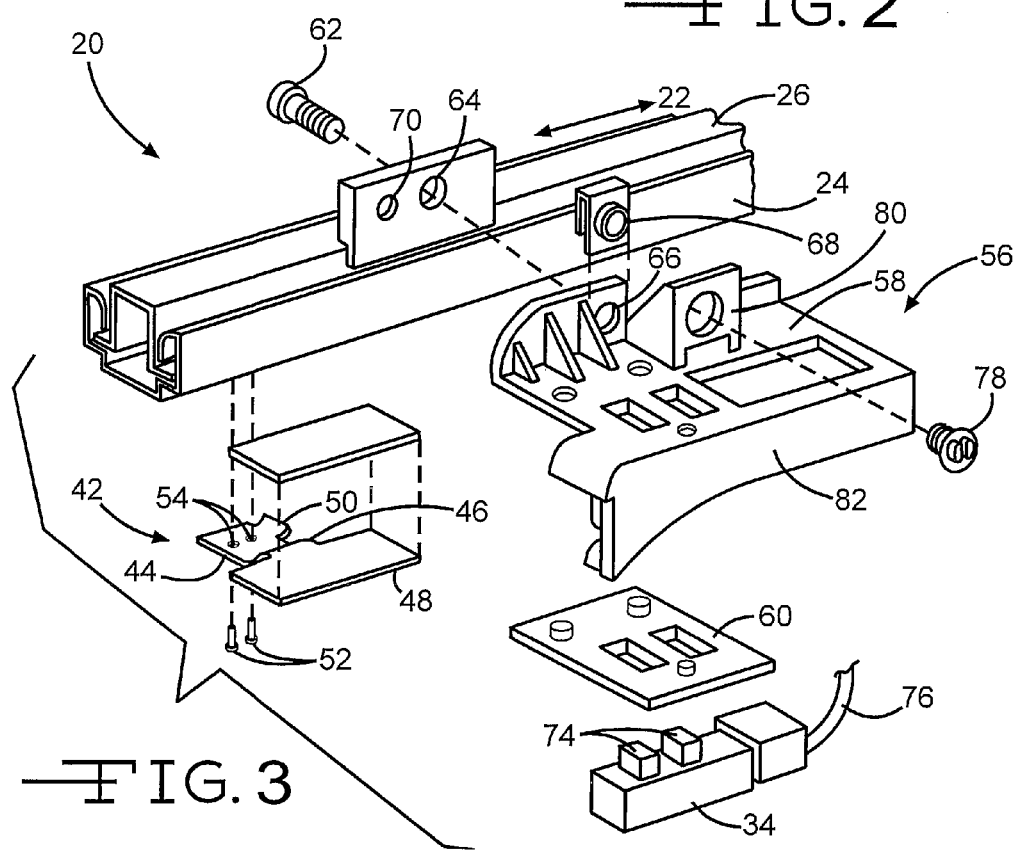
FIG. 3

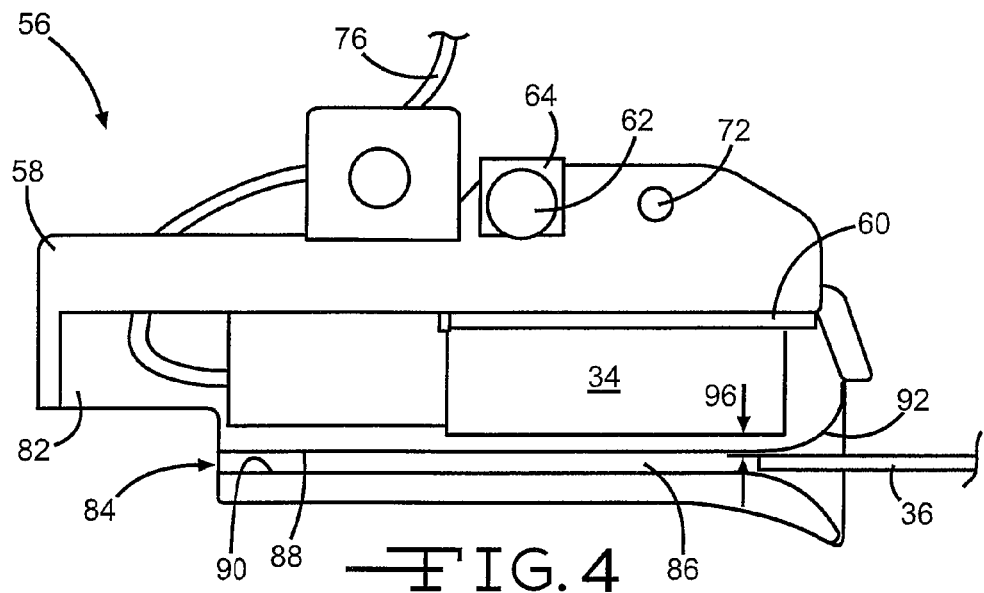
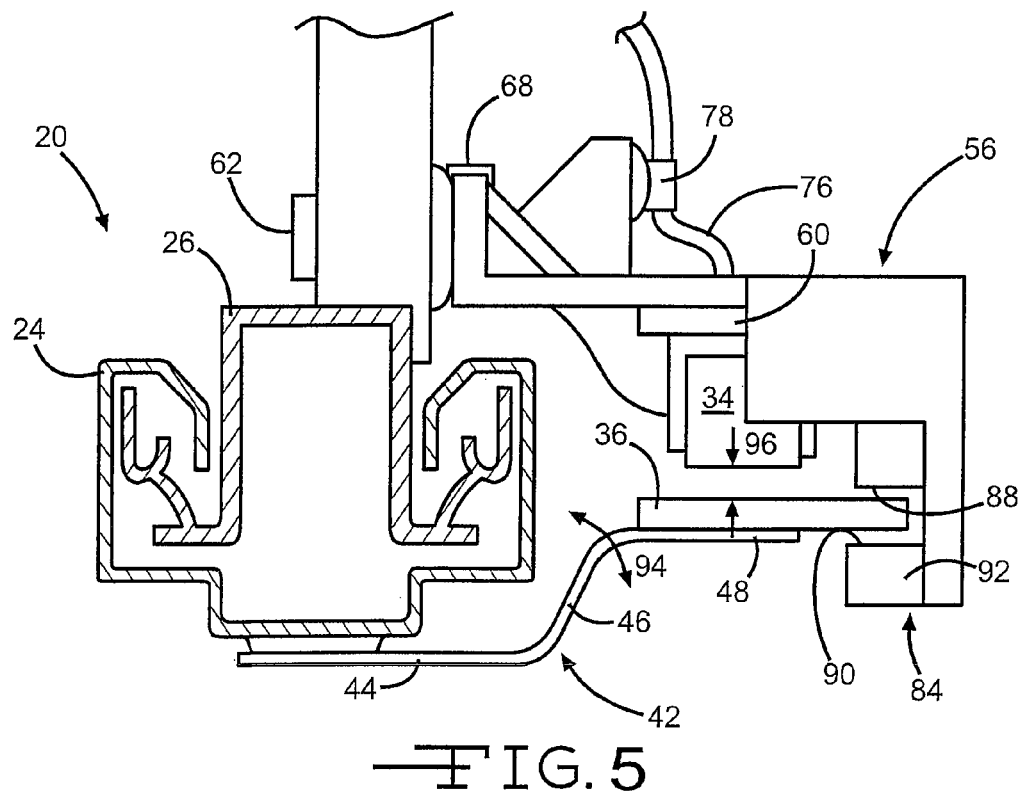

SENSOR ASSEMBLY FOR A MOVABLE SEAT

BACKGROUND OF THE INVENTION

This invention relates in general to a seat that is movable relative to an ancillary structure, such as a vehicular seat that is movable relative to an airbag mechanism. In particular, this invention relates to an improved sensor assembly for use with such a relatively movable seat that can simply and inexpensively maintain a predetermined distance between sensor and target portions thereof.

In many environments, a seat is supported for movement relative to an ancillary mechanism. For example, in many vehicles, the driver or passenger seats of the vehicle are movable in both forward and rearward directions relative to an airbag mechanism or other supplemental restraint system that is provided within a steering wheel or an instrument panel. Such a movable seat is usually provided to facilitate comfort of an occupant of the seat within the particular environment.

In some of these environments, it may be desirable to control the operation of the ancillary mechanism in accordance with the position of the movable seat relative thereto. For example, in a vehicle having a movable seat, it may be desirable to control the operation of the airbag mechanism in accordance with the relative position of the movable seat. As is well known, a typical airbag mechanism includes a flexible bag that is rapidly inflated in response to the occurrence of a predetermined event, such as a collision, in order to cushion an impact that might otherwise occur to the occupant. In certain instances, it may be desirable to control the rate at which the flexible bag is inflated or the total volume of such inflation in accordance with the position of the movable seat (and the occupant) relative to the airbag mechanism.

To accomplish this, it is known to provide a sensor assembly that can generate a signal that is representative of a position of such a relatively movable seat. A typical sensor assembly includes a sensor portion, which is supported on one of the movable seat and a support surface, and a target portion, which is supported on the other of the movable seat and the support surface. When the seat is moved relative to a predetermined position relative to the support surface, the sensor portion detects the target portion and generates a seat position signal. This seat position signal is fed to a controller that operates the airbag mechanism. The controller can be responsive to the seat position signal to control the rate at which the flexible bag is inflated or the total volume of such inflation in accordance with the position of the movable seat relative to the airbag mechanism.

In such sensor assemblies, it is often desirable to maintain a predetermined distance between the sensor portion and the target portion. Although known sensor assemblies have functioned satisfactorily, it has been found that the distance between the sensor portion and the target portion may vary undesirably as a result of tolerance variations in the assembly of the various components of the movable seat and for other reasons. Thus, it would be desirable to provide an improved sensor assembly that can simply and inexpensively maintain a predetermined distance between the sensor and target portions thereof.

SUMMARY OF THE INVENTION

This invention relates to a slide assembly including a first member and a second member support for movement relative to the first member. The slide assembly also includes a sensor supported on one of the first member and the second member and a target supported on the other of the first member and the second member. The sensor generates a signal when the target is within a detection bounds. The slide assembly is characterized in that cooperating guides are supported relative to the sensor and the target and are engageable with one another to maintain a predetermined alignment between the sensor and the target.

Various aspects of this invention will become apparent to those skilled in the art from the following detailed description of the preferred embodiments, when read in light of the accompanying drawings.

BRIEF DESCRIPTION OF THE DRAWINGS

FIG. 1 is a perspective view of a vehicle including a seat having a seat position sensor assembly.

FIG. 2 is a schematic, side elevational view of the seat and seat position sensor assembly of FIG. 1.

FIG. 3 is an exploded, perspective view of the seat track and seat position sensor assembly of the seat of FIG. 2.

FIG. 4 is a side elevational view of the assembled seat position sensor assembly of FIG. 3.

FIG. 5 is an end elevational view of the assembled seat position sensor assembly of FIG. 3.

DETAILED DESCRIPTION OF THE PREFERRED EMBODIMENTS

Figure 6:
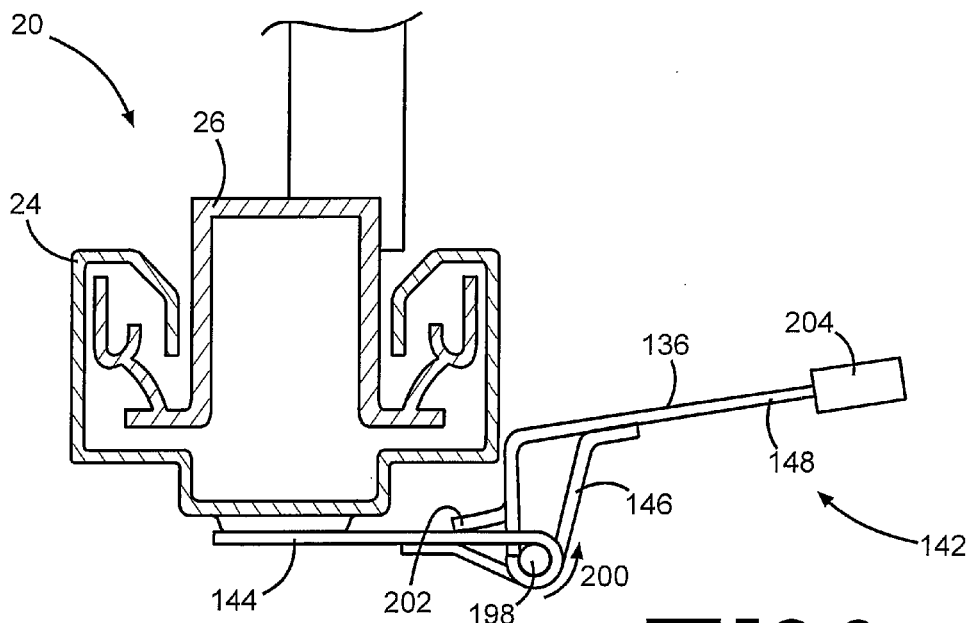
FIG. 6 is an end elevational view of a second embodiment of a seat position sensor assembly target.

Referring now to the drawings, there is illustrated in FIG. 1 a vehicle, indicated generally at 10. The vehicle 10 includes a driver seat 12 and a passenger seat 14. The driver seat 12 and the passenger seat 14 are supported relative to the floor 16 of the vehicle.

Referring now to FIG. 2, a schematic view of the driver seat 12 is shown. A slide assembly, indicated generally at 20, is provided between the driver seat 12 and the floor 16. The slide assembly 20 includes a first member 24 that is attached to the floor 16 by mounts 18. As a result, the first member 24 is fixed in position relative to the floor 16. The slide assembly 20 also includes a second member 26. The second member 26 is supported relative to the first member 24 and can be moved relative to the first member 26. Therefore, the second member 26 can be moved relative to the floor 16. The driver seat 12 is attached to the second member 26. Thus, the driver seat 12 can also be moved relative to the floor 16. The driver seat 12 is able to move fore and aft, as indicated by the arrow 22. This allows the driver seat 12 to be adjusted relative to other vehicle components, such as a dash 28 or a steering wheel 30 of the vehicle 10.

The slide assembly 20 includes a seat position sensor assembly, indicated generally at 32. The seat position sensor assembly 32 includes a sensor 34 and a target 36. In the illustrated embodiment, the sensor 34 is mounted on the second member 26 and the target 36 is mounted on the first member 24. It should be appreciated that alternatively, the sensor 34 could be mounted on the first member 24 and the target 36 could be mounted on the second member 26. Further, it should be appreciated that the sensor 34 and the target 36 could be mounted on the floor 16 and the seat 12.

As the slide assembly 20 is moved through a range of positions, the sensor 34 and the target 36 will be in varying positions with respect to each other. The sensor 34 can be a Hall effect sensor, an optical sensor, a mechanical sensor, or any other suitable sensor. The sensor 34 is configured to detect when the target 36 is located adjacent to the sensor 34. When the slide assembly 20 is within a detection bounds, the sensor 34 and the target 36 are positioned in a predetermined alignment such that the sensor 34 is able to detect to the target 36. It should be appreciated that the sensor 34 and the target 36 may be situated so that the sensor 34 detects the target 36 when the seat is in the rearward position, when the seat is in the forward position, or when the seat is in an intermediate position. It should also be understood that while the embodiment of the seat position sensor assembly 32 described includes one sensor 34 and one target 36, additional sensors and additional targets can be included.

The sensor 34 is configured to generate a signal 37. The signal 37 is transmitted to a controller 38. In the illustrated embodiment, the controller 38 regulates the discharge force of an airbag. The controller 38 is configured to lower the discharge force of the airbag when the driver seat 12 is in the forward position and increase the discharge force of the airbag when the driver seat 12 is in a rearward position. It should also be appreciated that while the airbag is illustrated as being on the steering wheel 30 in front of the driver seat 12, the seat position sensor assembly 32 is suitable for use in relation to other restraint systems and on other seats. For example, the seat position sensor assembly 32 can be used on the passenger seat 14 and can be in communication with a dash-mounted airbag. It should also be appreciated that the controller 38 may control components mounted in the vehicle 10 other than or in addition to the airbag.

Referring to FIG. 3, the illustrated slide assembly 20 includes two tracks. The first member 24 is a lower track, which is mounted to the floor 16. The second member 26 is an upper track, which can be slid relative to the lower track in the fore and aft direction 22. The driver seat 12 (not shown in FIG. 3) is attached to the upper track. It should be appreciated that the slide assembly 20 typically includes a releasable locking mechanism (not shown) to prevent the second member 26 from moving relative to the first member 24. This allows the driver seat 12 to be adjusted within the vehicle 10 to a desired position and helps prevent the driver seat 12 from moving from that position.

A target bracket, indicated generally at 42, is mounted on the first member 24. The illustrated target bracket 42 is a single piece of steel. The target bracket 42 can be made of aluminum, plastic, or other desired materials. Additionally, the target bracket 42 can be made of multiple pieces of material, if desired. As better seen in reference to FIG. 5, the target bracket 42 includes a mounting portion 44, a resilient portion 46, and a target portion 48. Referring back to FIG. 3, the mounting portion 44 includes an optional, upwardly bent target yoke 50. The first member 24 includes a target mounting hole (not shown) that is configured to accommodate the target yoke 50. During assembly, the target yoke 50 cooperates with the target mounting hole in order to assist in the proper positioning of the mounting portion 44 relative to the first member 24. The mounting portion 44 includes one or more holes 54. The target bracket 42 is fixed relative to the first member 24 by rivets 52 that extend through the holes 54 and into engagement with the first member 24. It should be appreciated that other suitable fasteners can be used, such as bolts, screws, adhesives, or welding.

The resilient portion 46 of the target bracket 42 is substantially S-shaped in cross-section. However, it should be appreciated that the resilient portion 46 can have other desired shapes. The resilient portion 46 helps maintain the target portion 48 in a predetermined position relative to the mounting portion 44, while allowing a limited amount of movement of the target portion 48 relative to the mounting portion 44. The resilient portion 46 will be explained in more detail below in reference to FIG. 5.

The target portion 48 is used for the attachment of the target 36. The target 36 is a metal plate that is spot welded to the target portion 48. It should be appreciated that the target 36 can be attached to the target portion 48 by other desired fasteners, including bolts, screws or adhesives. It should also be appreciated that the target 36 does not have to be a separate piece, but can be integral with the target bracket 42. It should be appreciated that the target 36 can be made of other desired materials, and suitable materials for the target 36 can vary depending on the type of sensor 34 used.

A sensor bracket, indicated generally at 56, is attached to the second member 26. The sensor 34 is attached to the sensor bracket 56. The sensor bracket 56 includes a body 58. The illustrated body 58 is a molded plastic component. The body 58 can be made of other desired materials and by other desired methods. A sensor mounting plate 60 is attached to the body 58. The sensor mounting plate 60 can be attached to the body 58 by a compression fit or by adhesives, rivets, or any other desired fasteners. The sensor mounting plate 60 helps protect the sensor 34 from magnetic interference. It should be appreciated that the sensor mounting plate 60 may not be necessary, depending on the type of sensor used, as well as on the placement of other electrical components within the vehicle 10. Also, the sensor mounting plate 60 could be integral with the sensor bracket 56, rather than being a separate piece.

The sensor bracket 56 is mounted on the second member 26 by a mounting screw 62. The mounting screw 62 passes through a first mounting hole 64 on the second member 26 and a second mounting hole 66 on the sensor bracket 56. A panel nut 68 is positioned over the sensor bracket 56 so that the mounting screw 62 passes through the second mounting hole 66 and the panel nut 68. The second member 26 also includes a mounting slot 70. A mounting tab 72 (shown in FIG. 4) on the sensor bracket 56 fits into the mounting slot 70. The mounting tab 72 assists in proper position of the body 58 during assembly and engages the mounting slot 70 in order to assist in maintaining the proper orientation of the body 58. The illustrated mounting tab 72 is an integral part of the body 58. However, it should be appreciated that the mounting tab 72 could be a separate piece or could be replaced with some other connector, such as a rivet. It should also be appreciated that the sensor bracket 56 may be fixed relative to the second member 26 by other desired fasteners.

The sensor 34 is attached to the body 58 below the sensor mounting plate 60. Clips 74 on the sensor 34 assist in proper positioning of the sensor 34 relative to the body 58. The sensor 34 can be attached to the body 58 using grips, adhesives, screws, rivets, or other desired fasteners. The positioning sensor 34 includes a cable 76. The cable 76 is connected to the controller 38 (not shown in FIG. 3) and allows the sensor 34 to transmit the signal 37. The cable 76 also provides power to the sensor 34. The cable 76 is held by a cable clip 78. The body 58 includes a cable clip flange 80 that holds the cable clip 78 in an interference fit.

The body 58 includes an optional sensor guard 82. The sensor guard 82 is an extended portion of the body 58 that helps to protect the sensor 34. It should be appreciated that when the sensor bracket 56 is mounted on the second member 26, the sensor 34 is protected by the slide assembly 20 on one side, and the body 58 (including the sensor guard 82) on three other sides. This helps to prevent sensor 34 from being damaged by objects under the driver seat 12. It should be appreciated that the sensor 34 may be protected by other structures, such as by placing an enclosure around the seat position sensor assembly, for example.

Referring to FIGS. 4 and 5, additional components of the sensor bracket 56 are visible. FIG. 4 is a side, elevational view of the assembled sensor bracket 56, the view taken looking through the slide assembly 20 (which is not visible in FIG. 4). FIG. 5 is a front, elevational view of the assembled sensor bracket 56, the view taken looking from the front of the slide assembly 20. The body 58 includes a target guide, indicated generally at 84. The target guide 84 includes a channel 86 extending along one side of a portion of the sensor guard 82. The target guide 84 includes an upper guide surface 88 and a substantially parallel lower guide surface 90. Both the upper guide surface 88 and lower guide surface 90 are parallel to the sensor 34 for a portion of their length. The upper guide surface 88 and the lower guide surface 90 are shown as continuous surfaces, but this is not necessary. The upper guide surface 88 and lower guide surface 90 could be made of multiple, spaced apart arcuate components extending from the sensor guard 82, for example. The upper guide surface 88 and the lower guide surface 90 diverge from each other at the front end of the target guide 84 to define a funnel portion 92.

When the target bracket 42 and the sensor bracket 56 are assembled on the slide assembly 20, the components are positioned so that the target 36 is aligned with the target guide 84. Therefore, as the second member 26 is moved in the forward direction, the target 36 enters the target guide 84. The funnel portion 92 guides the target 36 into the channel 86 defined between the upper guide surface 88 and the lower guide surface 90. If the target 36 is too high, the upper guide surface 88 will apply a downward force on the target 36. Conversely, if the target 36 is too low, the lower guide surface 90 will apply an upwards force on the target 36. The edge portion of the target 36 acts as a guided surface, and the alignment between the target 36 and the sensor 34 can be adjusted. The resilient portion 46 of the target bracket 42 is sufficiently flexible to allow the target 36 to move in response to either of these forces, as indicated by arrow 94 on FIG. 5. Thus, the separation of the target 36 and the sensor 34 is adjusted. This allows the sensor 34 and the target 36 to be positioned into the predetermined alignment. This also allows a gap 96 between the sensor 34 and the target 36 to be kept within a predetermined distance. This adjustment helps to put the target 36 in the proper position to be detected by the sensor 34.

It should be appreciated that the size of the gap 96 and the range of possible sizes of the gap 96 depends on the details of the seat position sensor assembly 32. These details include the distance between the sensor 34 and the upper guide surface 88 and the lower guide surface 90, the thickness of the target 36, and the flexibility of the resilient portion 46. The configuration of the components of the seat position sensor assembly 32 may be selected so that the gap 96 is the proper size for the sensor 34 to detect the target 36 if the target is in contact with the upper guide surface 88, the lower guide surface 90, or any position in between. It should also be appreciated that the target 36 does not have to be moved as indicated by the arrow 94. As shown in FIG. 5, the target 36 may be positioned relative to the target guide 84 so that the target 36 can enter the channel 86 without contacting the upper guide surface 88 or the lower guide surface 90.

The target guide 84 and the target 36 are cooperating guides. Because these cooperating guides are engageable with one another to maintain a predetermined alignment between the sensor 34 and the target 36, there are wider manufacturing and assembly tolerances on the components of the slide assembly 20 and the seat position sensor assembly 32. That is, it is less important to make sure the target 36 is properly spaced from the sensor 34 during installation of the seat position sensor assembly 32. Also, the seat position sensor assembly 32 can be accidentally misaligned after installation, such as by being struck, but still function properly.

It should be appreciated that while the target guide 84 is shown as an integral part of the molded body 58, this is not necessary. The target guide 84 can be a separate piece attached to the body, for instance. Alternatively, the target guide 84 could be located on the target bracket 42. It should be appreciated that the seat position sensor assembly 32 can be configured so that the target 36 is fixed relative to one of the members of the slide assembly 20, and the sensor 34 could be mounted to adjust its position relative to the other member of the slide assembly 20.

Referring to FIGS. 6 through 9, a second embodiment of a target bracket, indicated generally at 142, is shown. Those components in the second embodiment that are similar to the first embodiment are identified using the same number. The second embodiment target bracket 142 includes a mounting portion 144, a target portion 148, and a resilient member 146. The mounting portion 144 is fixed relative to the first member 24 by fasteners such as rivets, bolts, screws, adhesives, or welding (not shown). The target portion 148 has an L-shaped cross section and is pivotally attached to the mounting portion 144 by a pivot pin 198. This allows the target portion 148 to rotate relative to the mounting portion 144 about an axis defined by the pivot pin 198. The resilient member 146 provides a biasing force between the mounting portion 144 and the target portion 148, causing the target portion 148 to rotate about the axis of the pivot pin 198 in the direction indicated by arrow 200 in FIG. 6. The target portion 148 includes an optional stop 202. The stop 202 is provided to limit the amount of movement of the target portion 148 relative to the mounting portion 144. Physical interference of the stop 202 with the surface of the mounting portion 144 limits how far the target portion 148 can rotate in direction 200.

The target bracket 142 also includes an optional trim piece 204. The trim piece 204 is a plastic piece that is interference fitted on one edge of the target portion 148. It should be appreciated that the trim piece 204 does not have to be a separate piece, but can be part of the target portion 148. The second embodiment target bracket 142 includes a target 136 as an integral part of the target portion 148. However, it should be appreciated that the target 136 can be a separate piece that is attached to the target portion 148.

Figure 7:
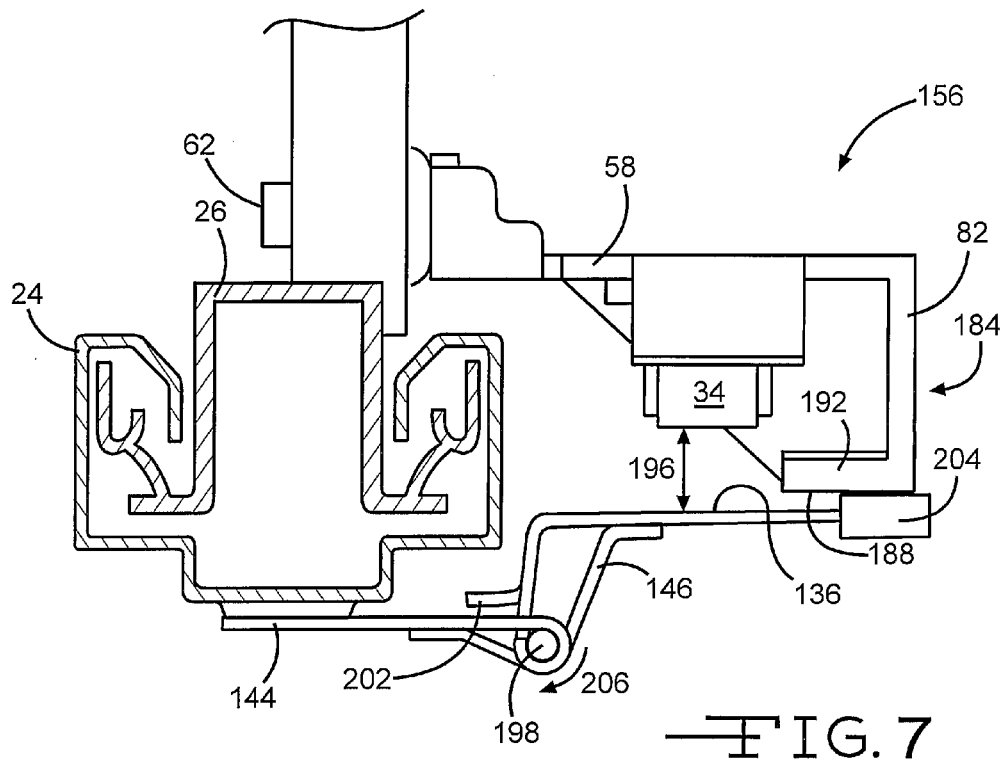
FIG. 7 is an end elevational view of the seat position target of FIG. 6 engaging a seat position sensor bracket.
Figure 8:
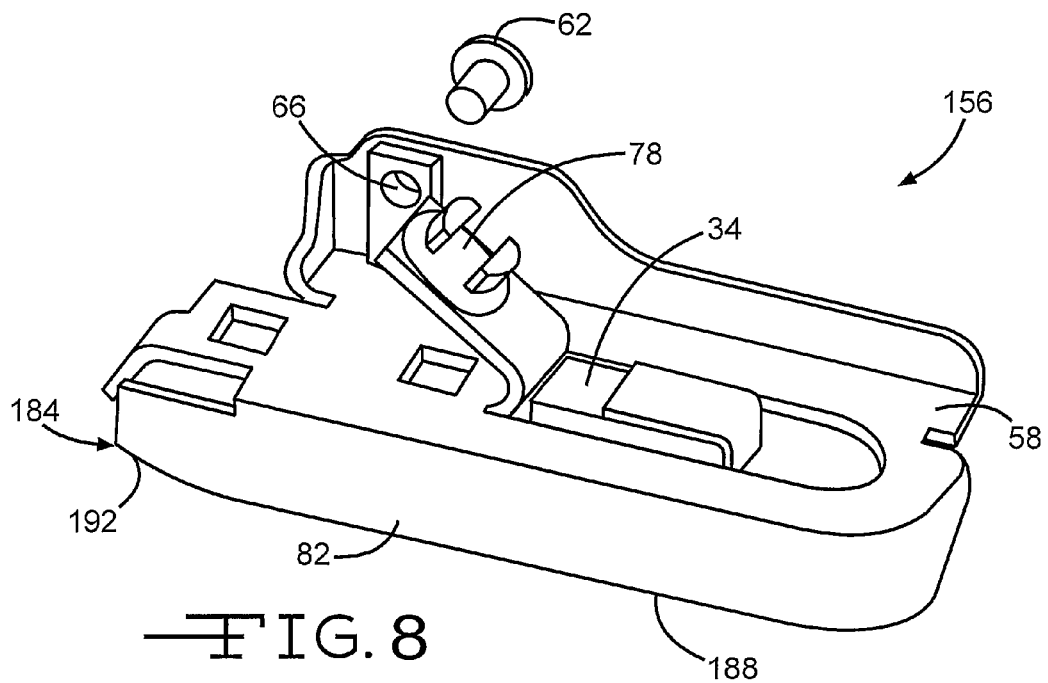
FIG. 8 is a perspective view, taken from above, of the seat position sensor bracket of FIG. 7.
Figure 9:
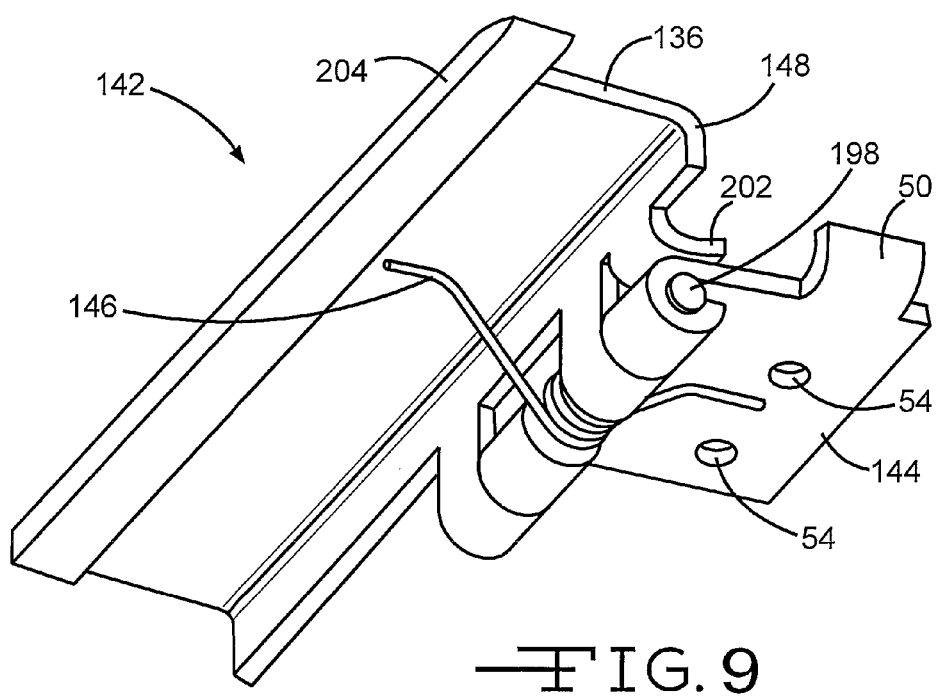
FIG. 9 is a perspective view, taken from below, of the seat position sensor assembly target of FIGS. 6 and 7.

Referring now to FIG. 7, the target bracket 142 is shown when the target bracket has engaged a sensor bracket 156. As shown, trim piece 204 engages a target guide, indicated generally at 184, on the sensor bracket 156. The target guide 184 includes an upper surface 188 extending along the sensor bracket 156. The upper surface 188 is parallel to the sensor 34 for a portion of its length. The upper surface 188 is shown as a continuous surface, but this is not necessary. The upper surface 188 could be made of multiple, spaced apart arcuate components, for example. The upper surface 188 is curved upward at the front end of the target guide 184 to create a ramp 192.

The target guide 184 is configured so that as the sensor bracket 156 approaches the target 136, the trim 204 engages the ramp 192. The resilient member 146 biasing the target portion 148 in the direction 200 causes the trim 204 to be in the proper position to engage the ramp 192. The ramp 192 serves to guide the target 136 onto the upper guide 188. This applies a downward force on the target portion 148, overcoming the biasing force of the resilient member 146 and causing the target portion 148 to rotate about the pivot pin 198 in the direction indicated by arrow 206 in FIG. 7. So, the position of the target 136 relative to a sensor 34 is automatically adjusted. This maintains the predetermined alignment between the sensor 34 and the target 136. This also allows the size of a gap 196 between the sensor 34 and the target 136 to be adjusted to be a predetermined distance. This adjustment helps to put the target 136 in the proper position to be detected by the sensor 34.

The principle and mode of operation of this invention have been explained and illustrated in its preferred embodiments. However, it must be understood that this invention may be practiced otherwise than as specifically explained and illustrated without departing from its spirit or scope.

What is claimed is:

1. An assembly comprising:
   a first member;
   a second member supported for movement throughout first and second ranges of positions relative to the first member;
   a sensor supported on one of the first member and the second member; and
   a target supported on the other of the first member and the second member;
   wherein the sensor generates a signal when the target is within a detection bounds; characterized in that cooperating guides are supported relative to the sensor and the target and are engageable with one another when the first and second members are in the first range of positions to maintain a predetermined alignment between the sensor and the target and are not engageable with one another when the first and second members are in the second range of positions.

2. The assembly of claim 1, further comprising a resilient member that biases the sensor and the target out of the predetermined alignment.

3. The assembly of claim 2, wherein the cooperating guides comprise a guide surface and a guided surface and the guide surface urges the guided surface against the force of the resilient member when the cooperating guides engage.

4. The assembly of claim 3, wherein the guided surface moves pivotally in relation to one of the first member and the second member when the guided surface is urged by the guide surface.

5. The assembly of claim 4, wherein the guide surface is mounted relative to the sensor, the guided surface is mounted relative to the target, and the target is mounted for pivotal movement relative to the one of the first member and the second member.

6. The assembly of claim 5, wherein the guided surface is an edge of the target.

7. A movable seat assembly including an assembly as recited in claim 5, wherein a seat is supported for movement with the second member.

8. A movable seat assembly including an assembly as recited in claim 1, wherein a seat is supported for movement with the second member.

9. The assembly of claim 1, wherein the cooperating guides include a first guide comprising two substantially parallel guide surfaces separated to define a channel and a second guide comprising a guided member, and wherein the guided member is disposed within the channel when the sensor and the target are in the predetermined proper alignment.

10. The assembly of claim 9, the first guide further comprising a funnel at an end of the channel.

11. The assembly of claim 10, wherein one of the first guide and the second guide is mounted for pivotal movement relative to one of the first member and the second member.

12. The assembly of claim 11, wherein the first guide is mounted relative to the sensor, the second guide is mounted relative to the target, and the target is mounted for pivotal movement relative to one of the first member and the second member.

13. A movable seat assembly including an assembly as recited in claim 12, wherein a seat is supported for movement with the second member.

14. The assembly of claim 12, wherein the guided member is an edge of the target.

15. A movable seat assembly including an assembly as recited in claim 14, wherein a seat is supported for movement with the second member.

16. An assembly comprising:
    a first member;
    a second member supported for movement relative to the first member;
    a sensor supported on the first member;
    cooperating guides supported relative to the sensor and the target and engageable with one another to move the target relative to the second member in order to maintain a gap between the sensor and the target within a predetermined distance when the target is within a detection bounds; and
    a target supported on the second member and able to move relative to the second member;
    wherein the sensor generates a signal when the target is within the detection bounds.

17. The assembly of claim 16, further including cooperating guides that are supported relative to the sensor and the target and are engageable with one another to maintain a predetermined alignment between the sensor and the target.

18. The assembly of claim 17, wherein the cooperating guides are engageable with one another to move to the target relative to the second member to position the target and the sensor in the predetermined alignment.

* * * * *